March 30, 1965 L. PÉRAS 3,175,677
SCRAP CONVEYORS FOR METAL WORKING WORKSHOPS
Filed Oct. 15, 1962 2 Sheets-Sheet 1
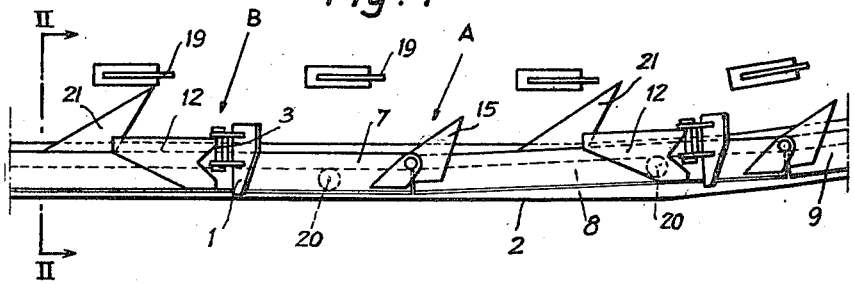
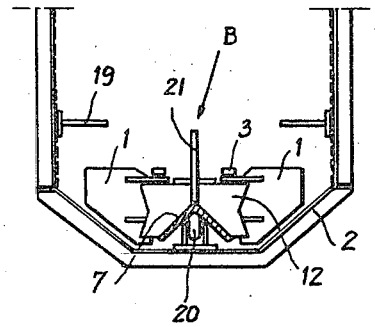
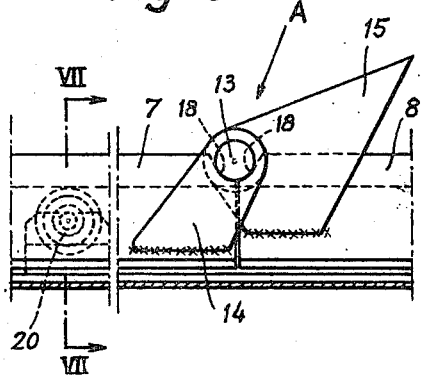
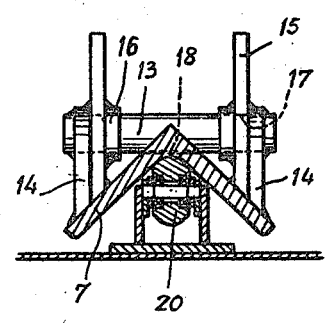
Inventor
Lucien Péras
By Stevens, Davis, Miller & Mosher
Attorneys Inventor
Lucien Peras
By Stevens, Davis, Miller & Mosher
Attorneys

United States Patent Office 3,175,677
Patented Mar. 30, 1965

3,175,677
SCRAP CONVEYORS FOR METAL WORKING
WORKSHOPS
Lucien Péras, Billancourt, Seine, France, assignor to Regie
Nationale des Usines Renault, Billancourt, Seine,
France
Filed Oct. 15, 1962, Ser. No. 230,614
Claims priority, application France, Oct. 25, 1961,
877,020, Patent 1,311,337
4 Claims. (Cl. 198—224)

The present invention is concerned with improvements in conveyors of the type designed more particularly for transporting scraps and shavings in metal working workshops, notably as described and illustrated in a prior patent application No. 125,057 filed by the same applicant on July 17, 1961, now United States Patent No. 3,112,025.

According to United States Patent No. 3,112,025, the scrap conveying device mounted in a collector channel consists of angle irons carrying the conventional drive means, these irons with the ridge turned upwards and the bisecting plane disposed vertically, bearing on rollers secured in the bottom of the channel and so shaped as to accommodate the curvature of the inner fillet between the two flanges.

With respect to this device the present invention provides an improvement consisting in accelerating the rate of discharge of small shavings or scraps while preventing the formation of a residual layer of scraps in the bottom of the inverted channel through the addition of movable blades carried by the drive chain. This arrangement is particularly efficient in the case of large-capacity conveyors operating on an inclined plane. It is completed by a substantial improvement and simplification of the pivot pins incorporated in said conveyor chain, which consist in utilizing relatively long pivot pins rigidly secured by means of plates welded on the outer ends of the angle-iron flanges; this last-mentioned arrangement being particularly advantageous when the chain path changes from a horizontal plane to an inclined plane.

A typical embodiment of the present invention will now be described by way of example with reference to the accompanying drawings, in which:

FIGURE 1 is a side elevational view showing a pair of hingedly interconnected elements of the scrap conveying chain, one element operating in a horizontal plane and the other in an inclined plane;

FIGURE 2 is a cross section taken upon the line II—II of FIG. 1;

FIGURES 6 and 7 illustrate also on a larger scale the simplified hinged coupling of the drive chain elements.

The drive chain (FIG. 1) consists of angle irons or like section elements 7, 8, 9 comprising for example welded or bent flat irons, which are driven to and fro in a channel 2 provided with spaced stationary spurs 19.

These elements are hingedly interconnected at A and carry each a set B consisting of two movable blades 1.

Figure 3:
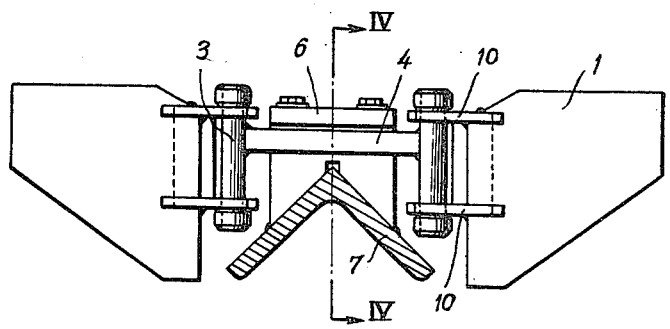
FIGURES 3, 4 and 5 illustrate on a larger scale the mounting of the blades on the drive chain.
Figure 4:
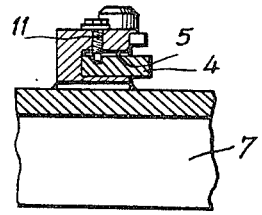

These blades 1 (FIG. 2) correspond substantially in shape to the cross-sectional configuration of the bottom portion of channel 2. They are hingedly mounted (FIGS. 3, 4 and 5) by means of a pair of pivot pins 3 carried by a common cross member 4 secured by screws 11 in a strap 5 of a bracket 6 welded on the angle iron 7, as shown notably in FIG. 3. The blades proper are each connected to the pivot pin 3 by a pair of arms 10. Furthermore, an axial spur 21 is associated with each assembly B.

Figure 5:
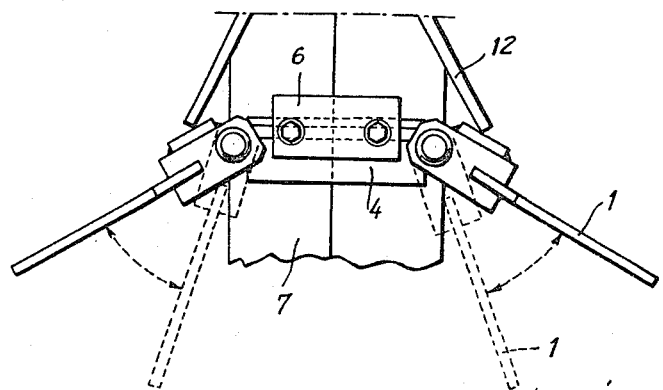

These blades operate as follows: during the backward or in operative stroke of the drive chain the blades are folded toward the center of the channel as shown in broken lines in FIG. 5. During the forward or operative stroke of the drive chain the blades abut against the driving V-shaped members 12 which hold them in their operative position for carrying along the metal scraps and shavings.

As clearly shown in FIGS. 6 and 7 of the drawings, the pivot pins 13 of the drive chain elements are carried by a pair of side plates 14 welded on one of the angle irons 7 and also by a pair of vertical spurs 15 welded on the other angle iron 8. Washers 16 welded on these vertical spurs 15 increase the width of the bearings 17. The pivot pin 13 is prevented from shifting axially by being welded on one of the side plates 14; moreover, notches 18 formed on the angle irons 7 and 8 permit the passage of pivot pin 13.

Of course, various modifications may be brought to the specific form of embodiment shown and described herein, without departing from the spirit and scope of the invention as set forth in the appended claims.

I claim:

1. A metal scrap conveyor comprising a trough, rollers mounted on the bottom of the trough, a reciprocating train of angle irons movably mounted on said rollers and having each leg disposed on opposite sides of said rollers, each angle iron having at least one spur at one end and at least one upwardly and forwardly extending side plate at the other end, a horizontally extending first pivot pin means mounted in each edjacent spur and side plate for providing a pivot connection between each said angle iron, each angle iron further comprising a pair of blades, each blade having a lower edge shaped substantially as the profile of the bottom of said trough, a pair of second pivot pins, means for vertically mounting each second pivot pins on opposite sides of said angle iron, each said blades pivotably mounted on each of said second pivot pins in a vertical plane, a pair of V-shaped means each rigidly mounted on opposite legs of said angle iron for guiding the scrap material in the trough outward when said angle iron train is moving rearward and limiting the degree of rearward pivoting movement of said blades when said angle iron train is moving forward.

2. A conveyor as set forth in claim 1, wherein said means for mounting said second pivot pins comprises a strap connected between said second pivot pins and an upstanding bracket means rigidly secured to the angle iron for securing said strap in a horizontal position.

3. A metal scrap conveyor as set forth in claim 1, further comprising an additional upstanding and forwarding extending spur mounted on top of each said angle iron and disposed contiguously and to the rear of said pair of V-shaped means.

4. A metal scrap conveyor as set forth in claim 3, wherein said V-shaped means comprises a vertically disposed plate extending outwardly and forwardly at a predetermined angle to the longitudinal axis of said angle iron, each said blade having abutment means located at the inner edge thereof and adapted to abut the forward edge of said outwardly and forwardly extending plate when said reciprocating train of angle irons is moving forward.

References Cited by the Examiner

UNITED STATES PATENTS 767,432  8/04  Park _____ 198—171

FOREIGN PATENTS 780,979  5/35  France.

OTHER REFERENCES

German printed application, 1,092,375, November 3, 1960.

SAMUEL F. COLEMAN, *Primary Examiner.*

WILLIAM B. LA BORDE, *Examiner.*